(12) United States Patent
Zouboff et al.

(10) Patent No.: US 11,920,961 B2
(45) Date of Patent: Mar. 5, 2024

(54) METHOD FOR CALIBRATING A CRANKSHAFT SENSOR BASED ON A CAMSHAFT SENSOR

(71) Applicant: VITESCO TECHNOLOGIES GmbH, Hanover (DE)

(72) Inventors: Pierre Zouboff, Toulouse (FR); Benjamin Marconato, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 609 days.

(21) Appl. No.: 17/259,814

(22) PCT Filed: Jul. 12, 2019

(86) PCT No.: PCT/EP2019/068897
§ 371 (c)(1),
(2) Date: Jan. 12, 2021

(87) PCT Pub. No.: WO2020/012020
PCT Pub. Date: Jan. 16, 2020

(65) Prior Publication Data
US 2021/0215514 A1 Jul. 15, 2021

(30) Foreign Application Priority Data
Jul. 13, 2018 (FR) ...................................... 1856455

(51) Int. Cl.
*G01D 5/244* (2006.01)
*G01D 5/14* (2006.01)
(Continued)

(52) U.S. Cl.
CPC ....... *G01D 5/24485* (2013.01); *G01D 18/008* (2013.01); *F02D 41/2432* (2013.01); *F02D 2400/11* (2013.01); *G01D 5/145* (2013.01)

(58) Field of Classification Search
CPC .......... F01L 2820/041; F01L 2820/042; F02D 2400/11; F02D 41/009; F02D 41/2432;
(Continued)

(56) References Cited

U.S. PATENT DOCUMENTS 6,655,187 B1 * 12/2003 Lehner ................ G01D 18/001
73/1.75
2002/0112683 A1 8/2002 Kunz
(Continued)

FOREIGN PATENT DOCUMENTS

CN 101469619 A 7/2009
CN 101876279 A 11/2010
(Continued)

OTHER PUBLICATIONS

Office Action issued in Chinese Patent Application No. 201980047022.4 dated Apr. 26, 2022.
(Continued)

*Primary Examiner* — David L Singer
(74) *Attorney, Agent, or Firm* — NIXON & VANDERHYE

(57) ABSTRACT

A method for calibrating a crankshaft sensor, of the type including a crankshaft wheel and a sensitive element facing the latter, during replacement of the crankshaft sensor, includes the following steps: saving an old angular position of a camshaft sensor wheel relative to the crankshaft wheel, which is achieved using the old crankshaft sensor, replacing the old crankshaft sensor with a new crankshaft sensor, determining a new angular position of the same camshaft sensor wheel relative to the crankshaft wheel, which is achieved using the new crankshaft sensor, correcting the measurement of the crankshaft sensor by applying an offset equal to the difference between the new angular position and the old angular position.

16 Claims, 2 Drawing Sheets

(51) Int. Cl.
  *G01D 18/00* (2006.01)
  *F02D 41/24* (2006.01)
(58) Field of Classification Search
  CPC .... G01D 18/001; G01D 18/008; G01D 3/022; G01D 5/145; G01D 5/24485
  See application file for complete search history.

(56) References Cited

U.S. PATENT DOCUMENTS

| | | | |
|---|---|---|---|
| 2008/0210021 A1* | 9/2008 | Steinruecken | G01D 18/001 73/862.328 |
| 2009/0165542 A1 | 7/2009 | Gray et al. | |
| 2010/0218588 A1 | 9/2010 | Staniewicz et al. | |
| 2010/0263438 A1 | 10/2010 | Bagnasco et al. | |
| 2013/0006496 A1 | 1/2013 | Sherwin et al. | |
| 2013/0090833 A1 | 4/2013 | Lachaize et al. | |
| 2018/0372010 A1 | 12/2018 | Zouboff et al. | |

FOREIGN PATENT DOCUMENTS

| | | | |
|---|---|---|---|
| CN | 104847431 A | 8/2015 | |
| FR | 2991720 A1 * | 12/2013 | ........... F02D 41/009 |
| FR | 3 045 725 | 6/2017 | |
| GB | 2491110 | 11/2012 | |
| JP | H11-8207 | 1/1999 | |
| JP | H11-82073 | 3/1999 | |
| WO | 2017/102073 | 6/2017 | |

OTHER PUBLICATIONS

International Search Report for PCT/EP2019/068897 dated Oct. 7, 2019, 6 pages.
Written Opinion of the ISA for PCT/EP2019/068897 dated Oct. 7, 2019, 5 pages.

* cited by examiner

METHOD FOR CALIBRATING A CRANKSHAFT SENSOR BASED ON A CAMSHAFT SENSOR

CROSS-REFERENCE TO RELATED APPLICATIONS

This application is the U.S. national phase of International Application No. PCT/EP2019/068897 filed Jul. 12, 2019 which designated the U.S. and claims priority to FR 1856455 filed Jul. 13, 2018, the entire contents of each of which are hereby incorporated by reference.

BACKGROUND OF THE INVENTION

Field of the Invention

The present invention relates to the field of crankshaft sensors. It relates in particular to a method for calibrating such a sensor during the replacement thereof.

Description of the Related Art

It is known in the automotive industry to use a crankshaft sensor to precisely ascertain the angular position of an internal combustion engine, in particular to perform engine control.

As illustrated in FIG. 1, such a crankshaft sensor $1a$, $1n$ conventionally comprises a crankshaft wheel 2 that rotates as one with the crankshaft. This crankshaft wheel 2 has a particular known profile, such as a set of teeth, at its periphery. The crankshaft sensor $1a$, $1n$ also comprises a sensitive element $3a$, $3n$, which is fixed relative to the engine block, capable of detecting the particular profile and disposed for this purpose facing the periphery of the crankshaft wheel 2. According to one embodiment, the crankshaft wheel 2 is metallic and the sensitive element $3a$, $3n$ is able to detect metal, such as a Hall effect sensor. The profile of the crankshaft wheel 2 typically comprises a regular set of teeth, comprising a high and known number of teeth and at least one index 4 that makes it possible to identify a position on the revolution, such as one or more missing teeth. According to one possible embodiment, a crankshaft wheel comprises 60 teeth, two of which are absent so as to form an index 4. In a known manner, such a crankshaft sensor $1a$, $1n$ makes it possible to provide a precise measurement of the absolute angular position of the crankshaft wheel 2 and therefore of the crankshaft and of the engine.

In order to be able to use this angular position measurement, a calibration should be carried out. Such a calibration makes it possible to match an index 4 of the crankshaft wheel 2 with a particular angular position marker of the engine, typically the top dead center of a given cylinder. A calibration thus produces a calibration angle, for example expressed in the form of a relative angular position between said index 4 and said marker. Thus, by correcting a measurement of the angular position of said calibration angle, the marker is exactly at a desired value, for example 0° for a top dead center. Once this calibration angle has been determined, it is advantageously stored in a non-volatile memory by the computer responsible for the crankshaft sensor $1a$, $1n$. The first calibration is carried out in the factory and requires considerable metrological means.

During the lifetime of the vehicle, it may be necessary, in the event of failure, to replace the crankshaft sensor $1a$, $1n$. The question then arises of the calibration thereof. The considerable metrological means used for the first calibration are not necessarily available in aftersales. Thus, the method used during the first calibration is no longer usable.

SUMMARY OF THE INVENTION

The aim of the invention is to propose a calibration method that is simple, in that it typically requires only means that are available in aftersales, and is applicable during replacement of a crankshaft sensor.

This aim is achieved by using another angular reference supplied by a camshaft sensor and by realizing a corrective differential between a state using the old crankshaft sensor $1a$, before the replacement thereof, and a state using the new crankshaft sensor $1n$, after the replacement thereof.

The invention relates to a method for calibrating a crankshaft sensor, of the type comprising a crankshaft wheel and a sensitive element facing the latter, during replacement of the crankshaft sensor, comprising the following steps: saving an old angular position of a camshaft sensor wheel relative to the crankshaft wheel, which is achieved using the old crankshaft sensor, replacing the old crankshaft sensor with a new crankshaft sensor, determining a new angular position of the same camshaft sensor wheel relative to the crankshaft wheel, which is achieved using the new crankshaft sensor, correcting the measurement of the crankshaft sensor by applying an offset equal to the difference between the new angular position and the old angular position.

According to another feature, the saving step is triggered by information that replacement is being carried out, preferentially prior to the replacement.

According to another feature, the step of determining a new angular position involves identifying the camshaft sensor.

According to another feature, the step of determining a new angular position is carried out regularly, preferentially each time the computer/engine is started.

According to another feature, the step of correcting the measurement of the crankshaft sensor is carried out only during a restart immediately following information regarding replacement.

According to another feature, the first calibration of a crankshaft sensor is carried out using another method.

BRIEF DESCRIPTION OF THE DRAWINGS

Other innovative advantages and features of the invention will become apparent on reading the following description, which is provided by way of entirely nonlimiting indication, with reference to the appended drawings, in which.

DESCRIPTION OF THE PREFERRED EMBODIMENTS

For greater clarity, identical or similar elements are denoted by identical reference signs throughout the figures.

The index "a" denotes an element relating to an old crankshaft sensor, before replacement. The index "n" denotes an element relating to a new crankshaft sensor, after replacement.

Figure 1:
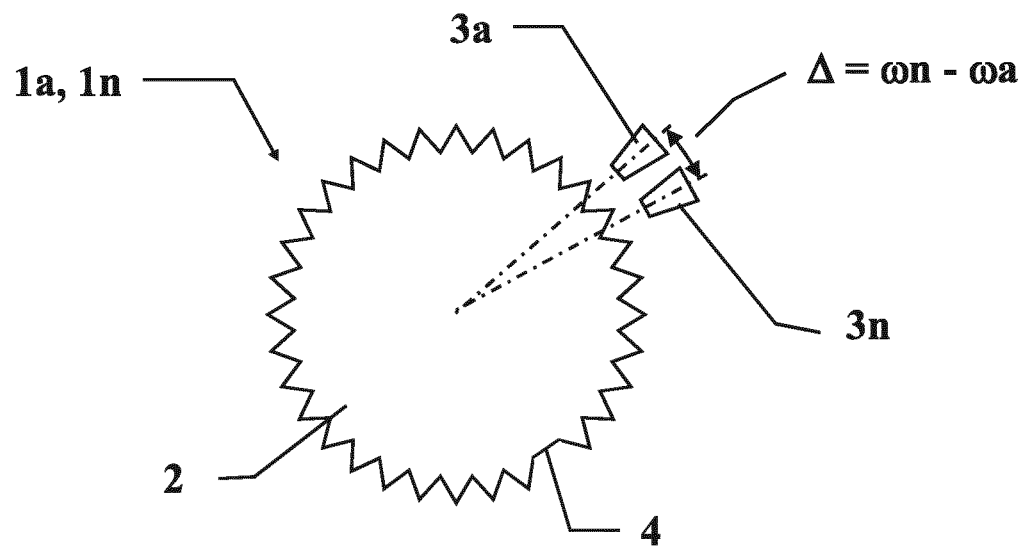
FIG. 1, which has already been described, illustrates the principle of a crankshaft sensor.

During replacement of an old crankshaft sensor 1a with a new crankshaft sensor 1n, an angular offset Δ between the old sensitive element 3a and the new sensitive element may arise, as is visible in FIG. 1. This offset may originate from the positioning of the sensitive element 3a, 3n relative to its support, the repeatability of which cannot be guaranteed. The sensitive element 3a, 3n typically comprises a printed circuit board overmolded in the sensitive element 3a, 3n. The repeatability of the relative position of the printed circuit board with respect to the sensitive element 3a, 3n can further increase the offset.

Thus, the value of the offset Δ should be identified, in order to correct any angular measurement carried out subsequently by means of the new crankshaft sensor 1n.

The basic principle of the method is to use another angular reference available in the form of a camshaft sensor.

Figure 2:
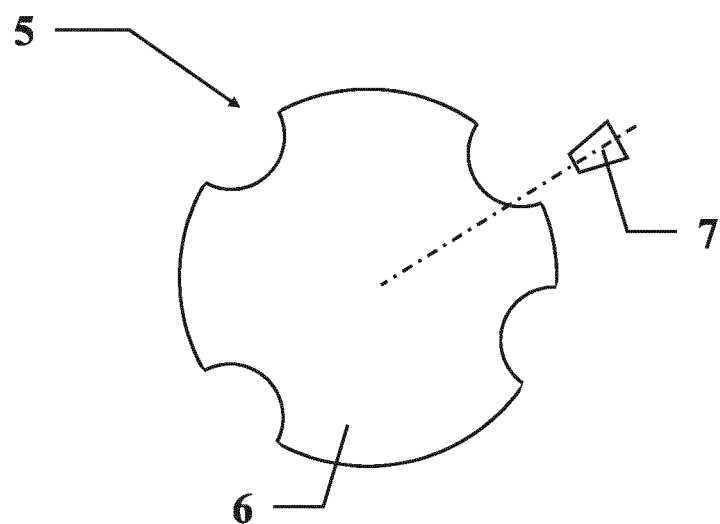
FIG. 2 illustrates the principle of a camshaft sensor.

Such a camshaft sensor 5 operates as illustrated in FIG. 2. In a manner similar to a crankshaft sensor 1a, 1n, a camshaft sensor has a camshaft wheel 6 and a sensitive element 7 arranged facing the latter. The camshaft wheel 6 rotates as one with a camshaft and has a particular known profile. In the case of a camshaft sensor 5, the camshaft wheel 6 conventionally comprises a small number of teeth, typically four, that are irregular both in terms of their size and in terms of their spacing.

The crankshaft sensor 1a, 1n is the reference angular sensor, calibrated relative to the engine. It is also, on account of its high number of teeth, the one that offers the best angular resolution. Thus, the one or more camshaft sensors 5 are referenced relative to the crankshaft sensor 1a, 1n. This means that the angular position of a camshaft wheel 6 is known relative to the crankshaft wheel 2. Thus, the angular position of the noteworthy elements of a camshaft wheel 6, i.e. typically the rising and/or falling tooth fronts, are known in an angular frame of reference as measured by a crankshaft sensor 1a, 1n. Thus, by using such a noteworthy element E of a camshaft wheel 6, the angular position of which does not change, and by comparing its angular position ωa as measured by the old crankshaft sensor 1a and its angular position ωn as measured by the new crankshaft sensor 1n, it is possible to determine the offset Δ and thus to carry out a calibration of a new crankshaft sensor 1n relative to the calibration of the old crankshaft sensor 1a.

The method for calibrating a crankshaft sensor 1a, 1n according to the invention is applicable to a crankshaft sensor 1a, 1n, of the type comprising a crankshaft wheel 2 and a sensitive element 3a, 3n facing the latter, as described above. This method is applicable to a calibration during replacement of the crankshaft sensor 1a, 1n, i.e. typically in aftersales.

This method comprises the following steps. Firstly, a reference should be kept of the state before the replacement of the crankshaft sensor 1a, in the form of a measurement taken with the old crankshaft sensor 1a. This measurement is a measurement of the angular position, called the old angular position ωa, of a camshaft sensor 5 wheel 6 referenced with respect to the crankshaft wheel 2, this measurement being taken with the old crankshaft sensor 1a. This measurement ωa is saved before the replacement of the sensor.

It should be noted that this saving can be performed as soon as an identification of the camshaft sensor 5 is available. Thus, an initial saving, preferentially in a non-volatile memory, is advantageous in that it thus remains available, including when the crankshaft sensor 1a fails and the replacement thereof is considered.

Figure 3:
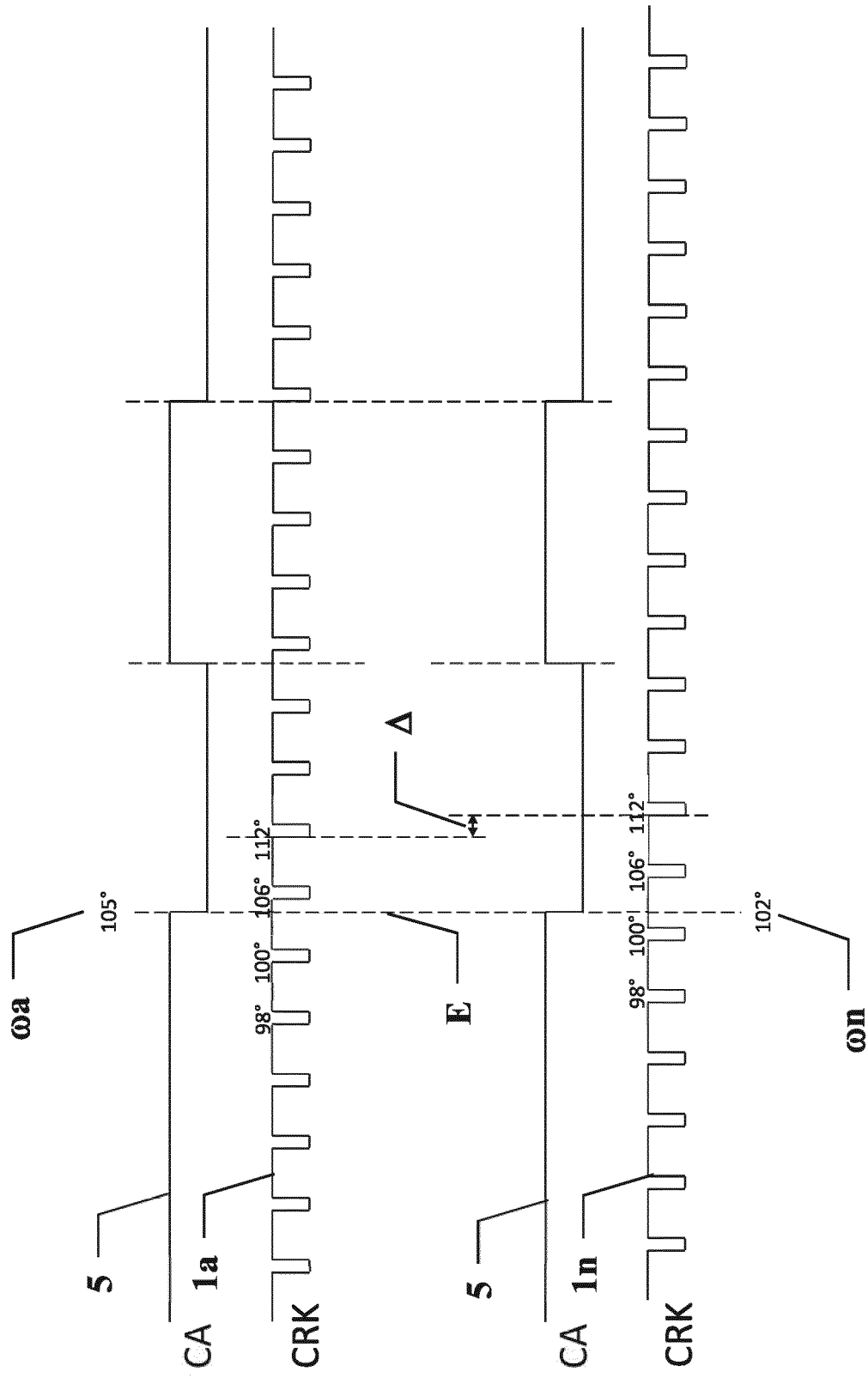
FIG. 3 shows, on a timing diagram, the compared signals of a camshaft sensor and of a crankshaft sensor before the replacement thereof, and of a camshaft sensor and of a crankshaft sensor after the replacement thereof.

FIG. 3 thus presents, in its top part, a curve resulting from the camshaft sensor 5 that is referenced relative to a curve resulting from the old crankshaft sensor 1a. The curve resulting from the old crankshaft sensor 1a allows the angular positions to be graduated in degrees crank (° CRK). An identification of the camshaft sensor 5 makes it possible to reference the camshaft wheel 6 relative to the crankshaft wheel 2 as seen by the old sensitive element 3a. The identification also makes it possible to know to which tooth a given rising or falling front as seen by the camshaft sensor 5 corresponds. After identification, it is possible to know the angular position of any noteworthy element of the camshaft sensor 5. Thus, if the front, for example the falling front, of any tooth, for example the first tooth, is considered, for example, as a particular event E, its old angular position ωa is equal, in the figure, to 105°. This value, which is indicative of the angular offset between the old crankshaft sensor 1a and the camshaft sensor 5, is saved.

During a subsequent step, the old crankshaft sensor 1a is replaced with a new crankshaft sensor 1n.

During a subsequent step, a new angular position ωn of the same camshaft sensor 5 wheel 6 is determined, relative to the crankshaft wheel 2. Advantageously, this new determination is now achieved using the new crankshaft sensor 1n. It follows that this new measurement ωn incorporates any error related to the difference in angular positioning between the old crankshaft sensor 1a and the new crankshaft sensor 1n.

This new determination first requires a new identification of the camshaft sensor 5 relative to the new crankshaft sensor 1n. This identification can be carried out by any method, such as the one described by the document US 20130090833.

FIG. 3 also presents, in its bottom part, a curve resulting from the camshaft sensor 5 that is referenced relative to a curve resulting from the new crankshaft sensor 1n. The curve resulting from the new crankshaft sensor 1n allows the angular positions to be graduated in degrees crank (° CRK). An identification of the camshaft sensor 5 makes it possible to reference the camshaft wheel 6 relative to the crankshaft wheel 2 as seen by the new sensitive element 3n. By taking the same particular event E as before, which it is known how to find by virtue of the identification, its new angular position ωn is equal, in the figure, to 102°.

It will be apparent to those skilled in the art that the difference ωn−ωa between the new angular position ωn and the old angular position ωa, for a single event E, represents the angular offset Δ between the new crankshaft sensor 1n and the old crankshaft sensor 1a.

Thus, a final step corrects the measurement of the new crankshaft sensor 1n by subtracting therefrom the difference Δ between the new angular position ωn and the old angular position ωa.

This correction Δ is advantageously stored in a non-volatile memory in order to be used to correct all the subsequent measurements until a possible new replacement of the crankshaft sensor 1n.

Returning to the example of FIG. 3, a difference arises:

$$\Delta = \omega n - \omega a = 102° - 105° = -3°$$

Thus, a measurement taken with the new crankshaft sensor 1n is corrected by subtracting the correction −3 therefrom, or by adding 3 thereto.

Such a calibration of the new crankshaft sensor 1n is relative in that it assumes that a previous calibration exists, the new calibration being carried out relative to the previous one. This is the case during replacement. Advantageously, this calibration does not require any means other than those present on the vehicle and a minor modification of the computer and/or its software. Thus, the invention is advantageously applicable to replacement in aftersales.

In practice, replacement of the crankshaft sensor $1a$, $1n$ is limited to replacement of the sensitive element $3a$, $3n$. Thus, the proposed method does not modify the referencing of the crankshaft wheel 2 relative to the engine. The proposed method, in that it is relative, advantageously makes it possible to carry out a calibration relative to the previous calibration and thus to keep the reference to the position of the engine.

According to an optional embodiment, the method is informed that replacement of the crankshaft sensor $1a$, In is going to be carried out. This is typically carried out by means of a command from the computer responsible for the crankshaft sensor. The information is then typically provided by an operator performing the replacement. This information is preferentially provided before proceeding with the replacement.

According to one embodiment, the saving of the old state, prior to the replacement of the sensor, is initial and permanent. Thus, when replacement is envisioned, this step has already been carried out.

According to an alternative embodiment, the saving is performed when necessary, before replacement. In this case, the saving is triggered by the reception of the information regarding replacement.

The step of determining a new angular position ωn, including, if necessary, an identification of the camshaft sensor, is carried out regularly, preferentially each time the computer/engine is started. Thus, as soon as replacement takes place, a new identification of the camshaft sensor is carried out. The computer/engine must be stopped in order to carry out replacement of the crankshaft sensor, and so a single new determination each time the computer is started is sufficient.

The step of correcting the measurement of the crankshaft sensor $1n$ by applying an offset $\Delta$ is carried out only during a restart immediately following information regarding replacement.

In the absence of the information regarding replacement, replacement of the crankshaft sensor can be detected a posteriori. To do this, a new angular position ωn is determined, including an identification of the camshaft sensor, each time the computer is started. The correction $\Delta$ is calculated. As long as $\Delta$ remains below a certain value, it can be considered that replacement has not taken place (or that the new sensor almost identically reproduces the characteristics of the old one, etc.) and no correction is applied. If, by contrast, $\Delta$ exceeds a certain value, replacement can be considered to have taken place and the correction is applied.

Since the method is recurrent, it is not applicable to a first calibration of a crankshaft sensor. Such a calibration has to be carried out by another method, such as the one described above, which is used in the factory and requires substantial metrological means.

It goes without saying that the camshaft sensor 5 serving as an intermediate reference during replacement of the crankshaft sensor $1a$, In must not be modified until the process of calibrating the crankshaft sensor has been completed.

Likewise, in the case of a camshaft having a variable reference (VVT), a common reference between the old state and the new state, for example the rest reference, generally used for starting, should be set.

In order to limit the consequences of variability in the relative position of the printed circuit board with respect to the sensitive element $3a$, $3n$, this aspect has until now been specified and carried out with very strict repeatability constraints, thereby further increasing the cost of a crankshaft sensor. The invention, by making it possible to overcome this problem, can advantageously make it possible to reduce these constraints and thus reduce the cost of a crankshaft sensor.

The invention is described above by way of example. It will be understood that a person skilled in the art is able to produce different variant embodiments of the invention, for example by combining the various features above, taken alone or in combination, without otherwise departing from the scope of the invention.

The invention claimed is:

1. A method for calibrating an old crankshaft sensor including a crankshaft wheel and a sensitive element facing the crankshaft wheel, during replacement of the crankshaft sensor, the method comprising:
   saving an old angular position of a wheel of a camshaft sensor relative to the crankshaft wheel, which is achieved using the old crankshaft sensor;
   replacing the old crankshaft sensor with a new crankshaft sensor;
   determining a new angular position of the same camshaft sensor wheel relative to the crankshaft wheel, which is achieved using the new crankshaft sensor; and,
   correcting a measurement of the new crankshaft sensor by applying an offset equal to the difference between the new angular position and the old angular position.

2. The method as claimed in claim 1, wherein the saving is triggered by information that a replacement of the old crankshaft sensor with the new crankshaft sensor is being carried out.

3. The method as claimed in claim 2, wherein the determining the new angular position involves identifying the camshaft sensor.

4. The method as claimed in claim 3, wherein the determining the new angular position is carried out regularly.

5. The method as claimed in claim 4, wherein the correcting the measurement of the crankshaft sensor is carried out only during a restart immediately following information regarding a replacement of the old crankshaft sensor with the new crankshaft sensor.

6. The method as claimed in claim 3, wherein the correcting the measurement of the crankshaft sensor is carried out only during a restart immediately following information regarding a replacement of the old crankshaft sensor with the new crankshaft sensor.

7. The method as claimed in claim 2, wherein the determining the new angular position is carried out regularly.

8. The method as claimed in claim 7, wherein the correcting the measurement of the crankshaft sensor is carried out only during a restart immediately following information regarding a replacement of the old crankshaft sensor with the new crankshaft sensor.

9. The method as claimed in claim 2, wherein
   the saving is triggered prior to the replacement being completed.

10. The method as claimed in claim 1, wherein the determining the new angular position involves identifying the camshaft sensor.

11. The method as claimed in claim 10, wherein the correcting the measurement of the crankshaft sensor is carried out only during a restart immediately following information regarding a replacement of the old crankshaft sensor with the new crankshaft sensor.

12. The method as claimed in claim 10, wherein the determining the new angular position is carried out regularly.

13. The method as claimed in claim 12, wherein the stop of correcting the measurement of the crankshaft sensor is carried out only during a restart immediately following information regarding a replacement of the old crankshaft sensor with the new crankshaft sensor.

14. The method as claimed in claim 1, wherein the determining the new angular position is carried out regularly.

15. The method as claimed in claim 14, wherein the correcting the measurement of the crankshaft sensor is carried out only during a restart immediately following information regarding a replacement of the old crankshaft sensor with the new crankshaft sensor.

16. The method as claimed in claim 14, wherein the determining the new angular position is carried out each time one or more of a computer and an engine is started.

\* \* \* \* \*